Patented Dec. 11, 1951

2,578,302

UNITED STATES PATENT OFFICE 2,578,302

METHYLENEDIOXYPHENYL COMPOUNDS CONTAINING SULFUR AS INSECTICIDE AND PYRETHRIN SYNERGISTS

Oscar F. Hedenburg, Pittsburgh, Pa., assignor to Harold W. Moburg, trustee, Toledo, Ohio No Drawing. Application September 29, 1948, Serial No. 51,862

8 Claims. (Cl. 260—338)

This invention relates to organic chemical compounds which are useful as insecticides and as synergists for pyrethrins, and to a method for the production thereof.

The aforementioned compounds are those comprehended by the generic formula

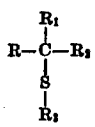

in which R is the 3,4-methylenedioxyphenyl radical or a 3,4-methylenedioxyphenyl-alkyl radical; $R_1$ is a hydrogen atom; $R_2$ is a hydrogen atom, or an alkyl, alkyl carbonyl, alkenyl carbonyl, aryl carbonyl, acyl methyl, or aroyl methyl radical; and $R_3$ is an alkyl, aryl, aralkyl, alkaryl, or alicyclic hydrocarbon radical.

The following examples illustrate in detail the preparation of various compounds falling within the general scope of the present invention. As the following subject matter indicates, certain of the compounds prepared in the examples were tested in the Peet-Grady test, using the Official Test Insecticide of the National Association of Insecticide and Disinfectant Manufacturers. The Official Test Insecticide contains about 100 mg. of pyrethrins one and two per 100 ml. That insecticide is the standard used in the industry in making comparative tests and is commonly known as the O. T. I., and shall so be referred to hereinafter.

Example I

Safrol and benzyl mercaptan were heated together for 40 hours at 100° C., and thereafter for a period of two hours at 206° C. This procedure yielded the compound λ-3,4-methylene dioxy phenyl propyl benzyl sulfide

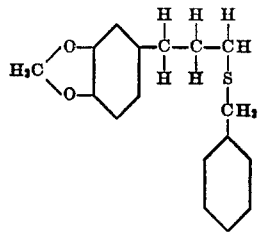

which for convenience will be referred to as No. 198.

The first Peet-Grady tests of this product showed a knockdown of flies which, for some unknown reason, was low but also showed a kill that was remarkably high. The synergistic effect, when compounded with pyrethrins one and two (present in the O. T. I. in quantity of about 100 mg. per 100 cc.), was as follows, according to the initial test:

| Composition | Knock-down | Kill | Ratio, kill to knock-down |
|---|---|---|---|
| | Per cent | Per cent | Per cent |
| 2% No. 198, 40 mg. pyrethrins 1 and 2 | 69.3 | 65.3 | 94 |
| O. T. I. | 69.5 | 39.7 | 57 |
| 0.4% No. 198, 60 mg. pyrethrins 1 and 2 | 63.6 | 56.4 | 89 |
| 0.5% No. 198, 60 mg. pyrethrins 1 and 2 | 69.4 | 62.2 | 90 |
| 0.3% No. 198, 60 mg. pyrethrins 1 and 2 | 68.0 | 59.7 | 88 |
| O. T. I. | 72.4 | 47.2 | 65 |

Subsequent repeated tests reveal a normal knockdown and the same high ratio of kill. The results of the second tests were as follows:

| Composition | Knock-down | Kill | Ratio, kill to knock-down |
|---|---|---|---|
| | Per cent | Per cent | Per cent |
| 1% new No. 198, 50 mg. pyrethrins 1 and 2 | 96.3 | 94.7 | 98 |
| 0.5% No. 198, 70 mg. pyrethrins 1 and 2 | 96.8 | 93.7 | 97 |
| O. T. I. | 98.1 | 77.5 | 79 |
| 0.5% No. 198, 60 mg. pyrethrins 1 and 2 | 98.0 | 93.7 | 95.5 |
| Do | 98.1 | 96.7 | 98.5 |
| O. T. I. | 99 | 75.5 | 76 |
| 0.3% No. 198, 40 mg. pyrethrins 1 and 2 | 99.2 | 82.2 | 83 |
| O. T. I. | 98.8 | 61.7 | 60.5 |

Example II

Benzyl mercaptan and isosafrol were heated together for 23 hours at 170° C. to produce the following product in a 91% yield:

β-3,4 methylene dioxy phenyl isopropyl benzyl sulfide

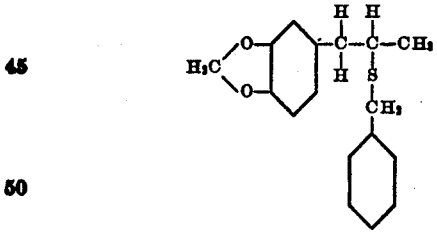

For convenience this compound will be referred to as No. 229, which when tested gave the following results.

| Composition | Knock-down | Kill | Ratio, kill to knock-down |
|---|---|---|---|
| 0.5% No. 229, 60 mg. pyrethrins 1 and 2 | Per cent 99.8 | Per cent 93.7 | Per cent 94 |
| O. T. I. | 99.8 | 61.5 | 62 |

*Example III*

Piperonal was reacted with methyl isobutyl ketone at low temperature and in the presence of sodium hydroxide, to yield by condensation the compound

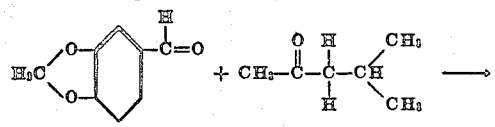

Piperonal   Methyl isobutyl ketone 3,4-methylene dioxy styryl isobutyl ketone
(piperonal methyl isobutyl ketone)

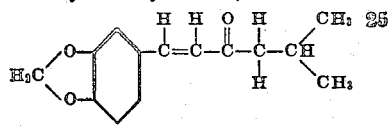

This compound was thereafter reacted with benzyl mercaptan by heating them together for 24 hours at 135° C. to produce in about a 99% yield the compound

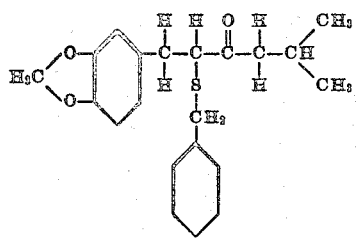

α-benzyl thio β-3,4-methylene dioxy phenyl ethyl isobutyl ketone

For convenience this compound will be referred to as No. 244, and when tested gave the following results.

| Composition | Knock-down | Kill | Ratio, kill to knock-down |
|---|---|---|---|
| 0.5% No. 244, 50 mg. pyrethrins 1 and 2 | Per cent 95.5 | Per cent 88.4 | Per cent 92 |
| O. T. I. | 96.7 | 63.2 | 65 |

*Example IV*

Piperonal and methyl heptenone were reacted together at low temperature in the presence of sodium hydroxide to yield the compound 3,4-methylene dioxy styryl isohexenyl ketone

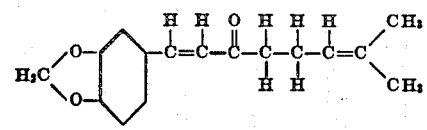

This compound was thereafter reacted with benzyl mercaptan by heating them together for 24 hours at 138° C. to produce a compound α-benzyl thio β-3,4-methylene dioxy phenyl ethyl isohexenyl ketone

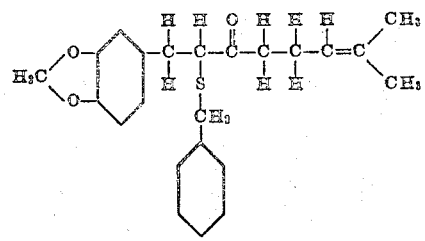

For convenience this compound will be referred to as No. 248, which gave the following results when tested.

| Composition | Knock-down | Kill | Ratio, kill to knock-down |
|---|---|---|---|
| 0.5% No. 248, 50 mg. pyrethrins 1 and 2 | Per cent 99 | Per cent 97.1 | Per cent 98 |
| O. T. I. | 95.4 | 63.4 | 69 |
| 0.3% No. 248, 40 mg. pyrethrins 1 and 2 | 98.7 | 89.3 | 90 |
| O. T. I. | 98.8 | 61.7 | 62 |

*Example V*

Piperonal and methyl hexyl ketone were reacted together in the presence of sodium hydroxide at low temperature to yield the compound 3,4-methylene dioxy styryl hexyl ketone
(piperonal methyl hexyl ketone)

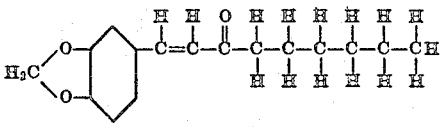

This compound was thereafter heated with benzyl mercaptan to 135°, 190° and 200° C., successively, to yield a mixture containing the following isomers:

α-benzyl thio β-3,4-methylene dioxy phenyl ethyl hexyl ketone, and β-benzyl thio β-3,4-methylene dioxy phenyl ethyl hexyl ketone

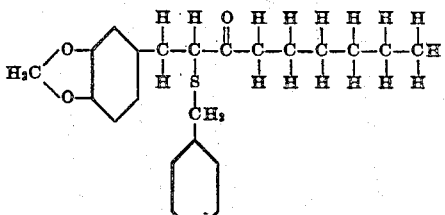

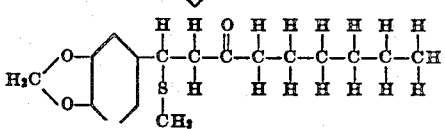

For convenience this mixture will be referred to as No. 269, which upon testing gave the following results.

| Composition | Knock-down | Kill | Ratio, kill to knock-down |
|---|---|---|---|
| 0.3% No. 269, 40 mg. pyrethrins 1 and 2 | Per cent 99.5 | Per cent 97 | Per cent 97 |
| O. T. I. | 98.8 | 61.7 | 62 |

Example VI

Piperonal was reacted with methyl amyl ketone at low temperature in the presence of sodium hydroxide to produce the compound piperonal methyl amyl ketone.

Piperonal methyl amyl ketone     Benzyl mercaptan

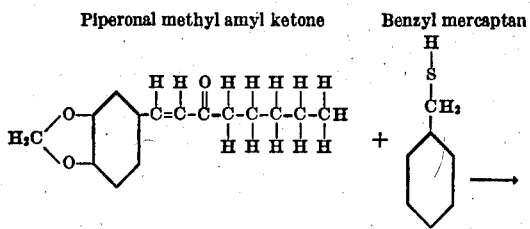

This compound was then reacted with benzyl mercaptan by heating at 130–220° C. to produce a reaction mixture of the following isomers:

α-benzyl thio β-3,4-methylene dioxy phenyl ethyl n-amyl ketone, and β-benzyl thio β-3,4-methylene dioxy phenyl ethyl n-amyl ketone

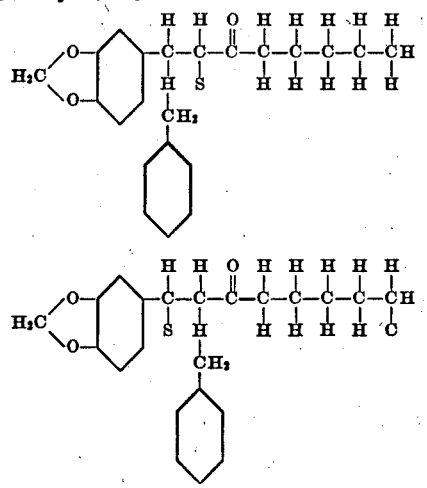

For convenience this mixture will be referred to as No. 270, which was tested and gave the following results.

| Composition | Knock-down | Kill | Ratio, kill to knock-down |
|---|---|---|---|
| 0.3% No. 270, 40 mg. pyrethrins 1 and 2 | Per cent 99.3 | Per cent 92.9 | Per cent 93 |
| O. T. I. | 98.8 | 61.7 | 62 |

Example VII

The intermediate of Example V was reacted with amyl mercaptan to yield a mixture of the following isomers:

α-amyl thio β-3,4-methylene dioxy phenyl ethyl hexyl ketone, and β-amyl thio β-3,4-methylene dioxy phenyl ethyl hexyl ketone

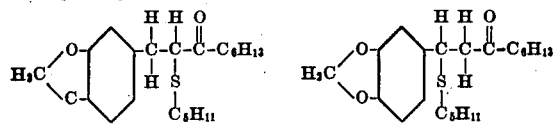

For convenience this mixture will be referred to as No. 272, and when tested gave the following results.

| Composition | Knock-down | Kill | Ratio, kill to knock-down |
|---|---|---|---|
| 0.3% No. 272, 40 mg. pyrethrins 1 and 2 | Per cent 99 | Per cent 91 | Per cent 92.6 |
| O. T. I. | 98.9 | 69 | 70 |

Example VIII

Safrol was reacted with amyl mercaptan by heating the reaction mixture to the boiling point of the mercaptan and allowed the reaction temperature to rise as the reaction progressed. The mixture began to boil at about 130° C., and at the end of the seventh day of heating, the temperature of the reaction mixture was 186° C. The product was a brown oil, consisting essentially of a mixture of the following compounds.

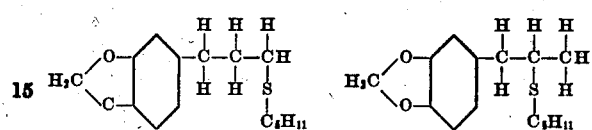

For convenience this mixture will be referred to as No. 273, and when tested gave the following results.

| Composition | Knock-down | Kill | Ratio, kill to knock-down |
|---|---|---|---|
| 0.5% No. 273, 40 mg. pyrethrins 1 and 2 | Per cent 99.7 | Per cent 93.6 | Per cent 93.8 |
| O. T. I. | 98.9 | 64 | 65 |

Example IX 3,4 - methylenedioxyphenyl benzyl thioethyl phenyl ketone having the structural formula

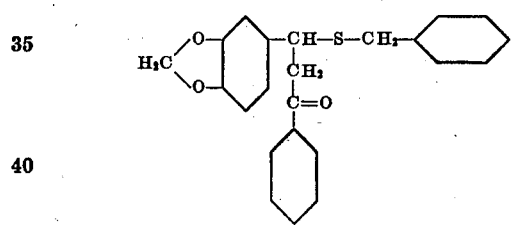

was made by heating together 11 gms. of piperonal acetophenone and 8 gms. of benzyl mercaptan during 17 hours at 150° C. and 3 hours at 200° C. There was obtained 18.5 gms. of crude product. A petroleum distillate solution containing 500 mg. of that product and 40 mg. of pyrethrins per 100 ml. gave a kill of 86.6% using house flies. The O. T. I. gave a 69% kill.

Example X 3,4-methylenedioxyphenyl methylphenyl thioethyl hexyl ketone having the structural formula

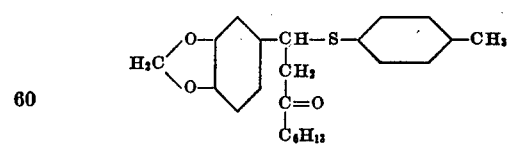

was made by heating for about 40 hours at 137° C. a mixture of 52 gms. of the intermediate unsaturated ketone of Example V and 24.8 gms. of parathiocresol. The crude product was dissolved in benzol and shaken with aqueous sodium hydroxide solution which extracted 2.6 gms. of parathiocresol. The benzol was dissolved off at reduced pressure, and 74 gms. of product was obtained. A petroleum distillate solution containing 500 mg. of that product and 40 mg. of pyrethrins per 100 ml. gave a 97.3% kill using house flies. The O. T. I. gave a 69.2% kill.

Example XI 3,4-methylenedioxyphenylpropyl - n - butylsulfide having the structural formula

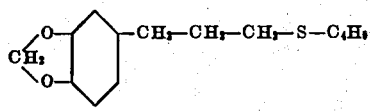

was made from 81 gms. of safrol in 66 gms. of n-butyl mercaptan by heating during 10 days at temperatures of 126-167° C. 22.5 gms. of butyl mercaptan was added to the 81 gms. of safrol at the beginning of the reaction. The temperature at that time was 144° C., and it rose in 24 hours to 151° C. Then 14.75 gms. of safrol was added, the temperature then being 133° C., and it rose after two days of heating to 153° C. 23.75 gms. of the mercaptan was then added, reducing the temperature to 126° C., but after four days of heating it rose to 140° C. 5 gms. of the mercaptan was added during that time, and during three days more of heating the reaction temperature was within the range 149-167° C. After the completion of the reaction, excess butyl mercaptan was distilled off, and the crude product was steam distilled to remove volatile matter. There was obtained 112.5 gms. of a light colored oil, constituting the product. A petroleum distillate solution of the product containing 300 mg. thereof and 40 mg. of pyrethrins per 100 ml. gave a 72.4% kill using house flies. The O. T. I. gave a 59.8% kill.

Example XII 3,4 - methylenedioxyphenyl - propyl-n-dodecyl sulfide having the structural formula

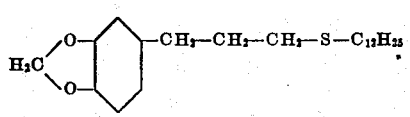

was made by heating together at 114° C. for 24 hours 22.28 gms. of safrol and 25.25 gms. of n-dodecyl mercaptan. The product was steam distilled to remove 7 ml. of safrol and other volatile substances, leaving in the distilling flask 42 gms. of a yellow material, constituting the product. A petroleum distillate solution containing 500 mg. of the product and 40 mg. of pyrethrins per 100 ml. gave a 73.5% kill using house flies. The O. T. I gave a 55.4% kill.

Example XIII 3,4 - methylenedioxyphenylpropyl cyclohexyl sulfide having the structural formula

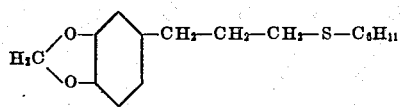

was made by heating at about 164° C. for 22 hours 44.5 gms. of safrol and 29 gms. of cyclohexyl mercaptan. After steam distillation of the reaction mixture, there remained in the distilling flask 43 gms. of a light brown oil, constituting the product. A petroleum distillate solution containing 300 mg. of the product and 40 mg. of pyrethrins gave a 61.2% kill using house flies. The O. T. I gave a 34.9% kill.

Various changes may be made in the specific teachings of the examples to provide additional products falling within the scope of the present invention. Thus, safrol or isosafrol may be reacted with methyl mercaptan, ethy mercaptan, isopropyl mercaptan, 2-ethylhexyl mercaptan, n-octyl mercaptan, thiophenol, phenylethyl mercaptan, o-thiocresol, m-thiocresol, the thioxylenols, cycloamyl mercaptan, cycloheptyl mercaptan, etc.

The unsaturated ketones containing the 3,4-methylenedioxyphenyl radical used as intermediates in the preparation of various products falling within the scope of the present invention may be prepared in the manner described in my application, Serial No. 477,444, filed February 27, 1943, of which application this application is a continuation-in-part and which issued October 26, 1948, as Patent No. 2,452,188. For example, such unsaturated ketones may be prepared by the condensation of piperonal with various methyl ketones, such as methyl ethyl ketone, methyl isopropyl ketone, methyl n-butyl ketone, methyl octyl ketone, methyl allyl ketone, methyl benzyl ketone, methyl phenylethyl ketone, methyl cyclopentyl ketone, methyl cyclohexyl ketone, methyl cycloheptyl ketone, methyl p-methylphenyl ketone, etc. Such ketones may thereafter be reacted with any of the mercaptans heretofore mentioned in the present specification to provide additional products falling within the scope of this invention.

I claim:

1. The addition products of isosafrol and benzyl mercaptan.

2. The method for the preparation of an insecticide which comprises reacting isosafrol and benzyl mercaptan to form an addition product.

3. The addition products of 3,4-methylenedioxystyryl amyl ketone and benzyl mercaptan.

4. The method for the preparation of an insecticide which comprises reacting 3,4-methylenedioxy styryl amyl ketone and benzyl mercaptan to form an addition product.

5. The addition products of safrol and amyl mercaptan.

6. The method for the preparation of an insecticide which comprises reacting safrol and amyl mercaptan to form an addition product.

7. The compound having the generic formula,

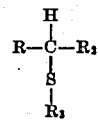

in which R is a substituent selected from the group consisting of the 3,4-methylenedioxyphenyl radical and the 3,4-methylenedioxyphenyl-alkyl radicals; $R_2$ is a substituent selected from the group consisting of the hydrogen atom and alkyl, alkyl carbonyl, alkenyl carbonyl, phenyl carbonyl, alicyclic carbonyl, acyl methyl and aroyl methyl radicals; and $R_3$ is a hydrocarbon substituent selected from the group consisting of alkyl, aryl, aralkyl, alkaryl, and alicyclic radicals.

8. The method for the preparation of insecticides which comprises reacting a compound of the formula $R_3SH$, in which $R_3$ is a hydrocarbon substituent selected from the group consisting of alkyl, aryl, aralkyl, alkaryl and alicyclic radicals, with a material selected from the group consisting of safrol, isosafrol and compounds having the generic formula

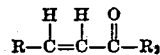

in which R is the 3,4-methylenedioxyphenyl radical and $R_2$ is a substituent selected from the group consisting of alkyl, alkenyl, aryl, aralkyl, alkaryl, and alicyclic radicals.

OSCAR F. HEDENBURG.

REFERENCES CITED

The following references are of record in the file of this patent:

UNITED STATES PATENTS

| Number | Name | Date |
|---|---|---|
| 2,430,116 | Holmes et al. | Nov. 4, 1947 |
| 2,433,491 | Synerholm | Dec. 30, 1947 |
| 2,442,555 | Synerholm | June 1, 1948 |
| 2,452,188 | Hedenburg | Oct. 26, 1948 |
| 2,456,316 | Prill | Dec. 14, 1948 |
| 2,456,991 | Prill | Dec. 21, 1948 |
| 2,457,957 | Wachs | Jan. 4, 1949 |
| 2,521,813 | Wachs | Sept. 12, 1950 |

OTHER REFERENCES

Prill et al. Contrib. Boyce Thompson Institute, vol. 14, No. 3 (1946), pages 127 to 131, 136.